(12) United States Patent
Smith et al.

(10) Patent No.: US 6,980,638 B1
(45) Date of Patent: Dec. 27, 2005

(54) FAILSAFE CONFIGURATION FOR ALTERNATIVE NETWORK TELEPHONY

(75) Inventors: Geoff Smith, Palo Alto, CA (US);
Michael Lee, Cupertino, CA (US);
Steve Young, Los Gatos, CA (US);
Todd Krein, San Jose, CA (US)

(73) Assignees: Vulcan Research LLC, Palo Alto, CA (US); Digeo, Inc., Kirkland, WA (US)

( * ) Notice: Subject to any disclaimer, the term of this patent is extended or adjusted under 35 U.S.C. 154(b) by 183 days.

(21) Appl. No.: 10/389,277

(22) Filed: Mar. 13, 2003

(51) Int. Cl.$^7$ .............................................. H04M 7/00
(52) U.S. Cl. .................. 379/221.01; 379/272; 379/273
(58) Field of Search ....................... 379/45, 46, 114.02, 379/220.01, 221.01, 221.02, 221.03, 271, 379/272, 273

(56) References Cited

U.S. PATENT DOCUMENTS

| | | | |
|---|---|---|---|
| 3,001,027 A * | 9/1961 | Armstrong et al. ............. | 379/2 |
| 5,675,577 A * | 10/1997 | Komatsu ..................... | 370/237 |
| 6,009,163 A * | 12/1999 | Nabkel et al. .......... | 379/266.01 |
| 6,377,677 B1 * | 4/2002 | Ackerley et al. ............ | 379/279 |
| 6,480,595 B1 * | 11/2002 | Hamano ..................... | 379/225 |
| 6,567,514 B2 * | 5/2003 | Fleischer et al. ....... | 379/221.03 |
| 6,721,395 B2 * | 4/2004 | Martinez ..................... | 379/45 |

FOREIGN PATENT DOCUMENTS

EP   0 584 918 A1 *   3/1994   ............. H04L 1/22

OTHER PUBLICATIONS

Anon, 2 Wire, Inc., various pages from website http://www.2wire.com/home/adap_fil.html.
Frank, Edward H. and Holloway, Jack, "Connecting the Home with a Phone Line Network Chip Set", IEEE Micro, Mar.-Apr. 2000.
Kistner, Toni, "An energized HomePNA touts telephony", Network World Fusion, http://www.nwfusion.com/cgi-bin/mailto/x.cgi.
Teliann Telimax 200 Data Sheet "last modified" Jun. 25, 2002.
Teliann Telimax 200 Data Sheet "last modified" Nov. 2, 2002.

\* cited by examiner

*Primary Examiner*—Bing Q. Bui
(74) *Attorney, Agent, or Firm*—Van Pelt, Yi & James LLP

(57) ABSTRACT

A failsafe configuration for alternative network telephony is disclosed. An indication as to whether an alternative network telephony call processing system is available to process calls from an associated piece of telephone equipment is received automatically and transparently to a user of the telephone equipment. Calls placed from the telephone equipment at a time when the alternative network telephony call processing system is available to process calls are processed via alternative network telephony. Calls placed from the telephone equipment at a time when the alternative network telephony call processing system is not available to process calls are processed via the public switched telephone network (PSTN).

32 Claims, 7 Drawing Sheets

FAILSAFE CONFIGURATION FOR ALTERNATIVE NETWORK TELEPHONY

This application is related to co-pending U.S. patent application Ser. No. 10/388,767 entitled SELECTIVE PROCESSING OF CALLS USING ALTERNATIVE NETWORK TELEPHONY filed Mar. 13, 2003, which is incorporated herein by reference for all purposes; and co-pending U.S. patent application Ser. No. 10/388,605 entitled PROVIDING MULTIPLE LINE FUNCTIONALITY USING ALTERNATIVE NETWORK TELEPHONY filed Mar. 13, 2003, which is incorporated herein by reference for all purposes.

FIELD OF THE INVENTION

The present invention relates generally to alternative network telephony. More specifically, a failsafe configuration for alternative network telephony is disclosed.

BACKGROUND OF THE INVENTION

In recent years alternative network telephony, using at least in part a network other than the public switched telephone network (PSTN) to enable two or more parties to carry on a conversation in real time, has become increasingly popular. The advent of high-speed access to networks, such as the Internet, has further fueled this trend. Telephone functionality has been provided using personal computers (PC's) or computer workstations connected via the Internet and/or other networks, often through high-speed connections such as cable modems or digital subscriber line (DSL) connections. Telephone functionality has also been provided via cable television networks through television set top boxes equipped with cable modems, for example.

In many cases, a packet switched network protocol, such as the Internet protocol (IP), is used to provide alternative network telephony (e.g., IP telephony). Under such a protocol, the analog audio signal generated by a speaking call participant is digitized and sent via the alternative network from the sending station to the receiving station(s) in one or more data packets in accordance with the applicable protocol. At the receiving end, the data typically is reassembled, if necessary, and converted back to an analog audio signal. The data is then typically delivered to the recipient via an audio output device, such as one or more speakers, a headset, or a telephone handset or other output device.

It would be desirable for cable television service providers, providers of interactive television services and/or equipment, and/or other providers or potential providers of alternative network telephony equipment and services to have a way to compete effectively with more traditional providers of long distance and/or local telephone service. Such competition may bring lower prices, better and expanded service, and more choice to consumers.

One potential obstacle to such competition is the fact that the provision of telephone service is highly regulated. For example, regulations typically may require that telephone service meet certain standards of "permanence"—e.g., that basic telephone service continue to be available for a prolonged period of loss of electrical power at the site served, so that a consumer could make a telephone call to obtain essential emergency services or engage in other essential telephonic communication, during a loss of power. These standards may be difficult for alternative network telephony systems to meet, as such systems typically run on a computer, set top box, or other processing system that requires a source of electrical power. Providing an uninterruptible power supply (UPS) for such systems may be prohibitively expensive and otherwise impractical.

Therefore, there is a need for a way to provide telephone service to consumers of such services via alternative network telephony that enables such service to be provided in a reasonable and cost effective way during power outages and/or other times when the alternative network telephony service may not be available.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A failsafe configuration for providing alternative network telephony is disclosed. The configuration is "failsafe" in the sense that in the event of a power outage, or unavailability of the system used to provide alternative network telephony due to some other reason, the telephone handset normally used for alternative network telephony is configured and aligned automatically for use to place and receive calls normally via the public switched telephone network (PSTN).

Figure 1:
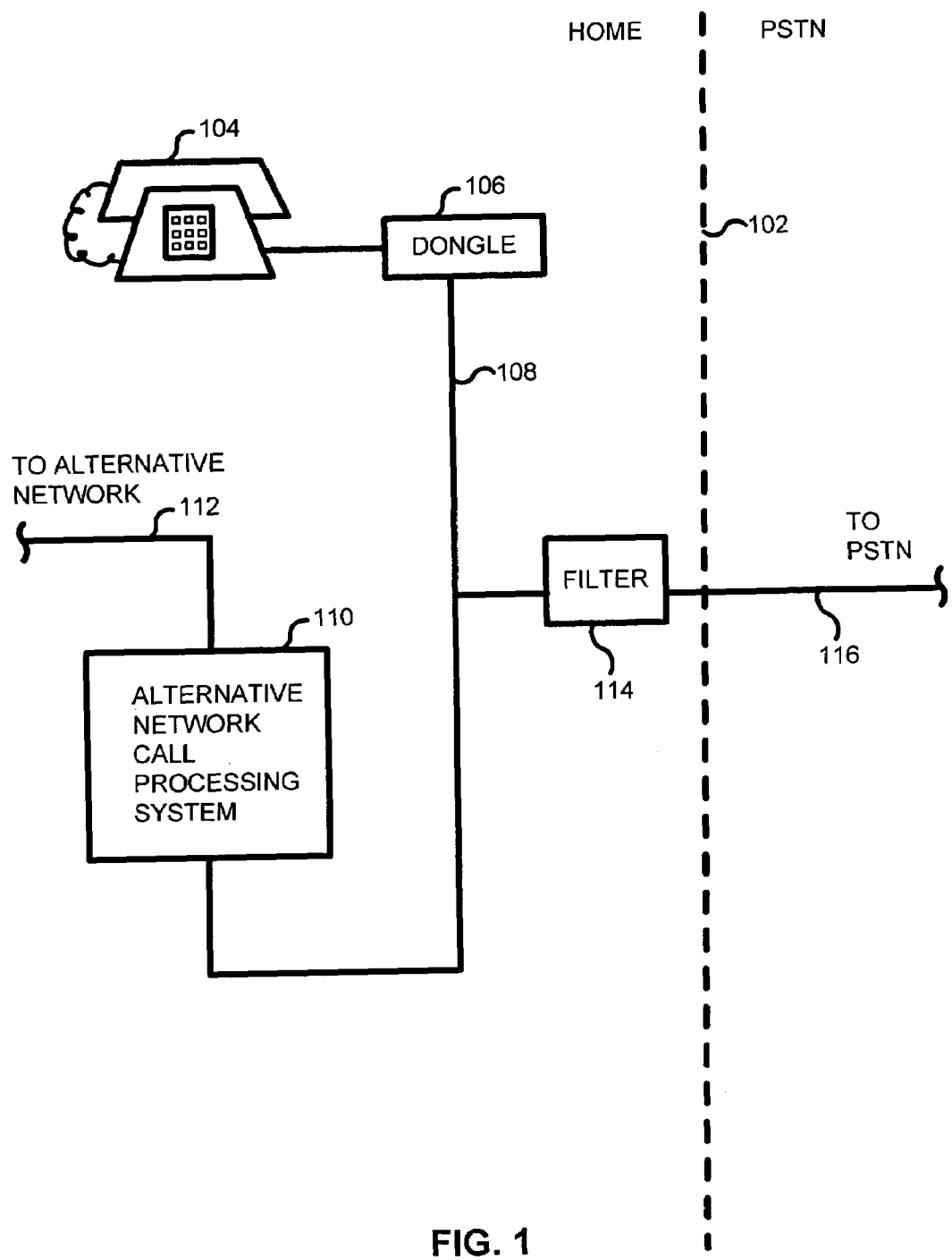
FIG. 1 is a schematic diagram of a failsafe configuration for using alternative network telephony.

FIG. 1 is a schematic diagram of a failsafe configuration for using alternative network telephony. A schematic representation of a boundary 102 between the home telephone wiring and the public switched telephone network is shown. In the home, a telephone 104 is connected via a dongle 106 to the internal telephone wiring 108. In one embodiment, the dongle 106 is connected by plugging the dongle into the telephone 104 and then connecting the dongle 106 to a telephone wiring jack via a connection cable. An alternative network call processing system 110 also is connected to the internal telephone wiring 108. The alternative network call processing system 110 is used to process telephone calls over an alternative network, as described more fully below. The alternative network call processing system 110 is connected to an alternative network, such as the Internet, via an alternative network connection 112. In one embodiment, the alternative network call processing system 110 is connected to the alternative network via a cable modem connected to a cable television system connection at the home. However, any suitable connection to the alternative network may be used. A filter 114 is interposed at the boundary 102 between the in home internal telephone wiring 108 and the external wiring connection 116 to the PSTN. As described more fully below, the filter 114 is used to prevent undesired interaction between the internal telephone system in the home (or other location) and the PSTN when an alternative network call is being processed in the home.

In one embodiment, the dongle 106 includes a frequency shifter used to shift the frequency of the audio signal received from the telephone handset 104 by a prescribed amount. In one embodiment, the audio signal is shifted by a prescribed amount on the order of 100 to 300 megahertz (MHz). In one embodiment, the filter 114 is configured such that signals shifted in frequency by the dongle 106 as described above would not pass through the filter 114 to the PSTN. In one embodiment, the filter 114 comprises a notch filter selected and configured such that the filter 114 will allow to pass in both directions all signals except those within a defined frequency band centered on the amount of frequency shift applied to the audio signal by dongle 106 as described above. As a result, audio signals shifted in frequency by operation of the dongle 106 do not pass through the filter 114 and are not passed either from the home to the PSTN or from the PSTN to the home.

As described more fully below, the alternative network call processing system 110 is configured to receive the frequency shifted signal output by the dongle 106 and to downshift the signal to the original frequency range. The call processing system 110 then processes the outgoing audio data for transmission in the manner well known in the art of alternative network telephony. Similarly, as described more fully below, audio data received by the call processing system 110 via the alternative network connection 112 is frequency shifted by the call processing system 110 by the same amount that the dongle 106 frequency shifts outgoing audio signals. The frequency-shifted signal is then provided to the internal telephone wiring 108. The frequency-shifted signal is received by the dongle 106 and downshifted to the normal voice audio frequency range, after which it is provided to the handset 104. In one embodiment, the alternative network call processing system 110 is configured to ignore signals on internal telephone wiring 108 in the normal voice audio frequency range that have not been frequency shifted out of that range. In one embodiment, as discussed more fully below, the alternative network call processing system 110 is so configured so as to permit un-shifted voice signals to be processed normally over the PSTN.

Figure 2:
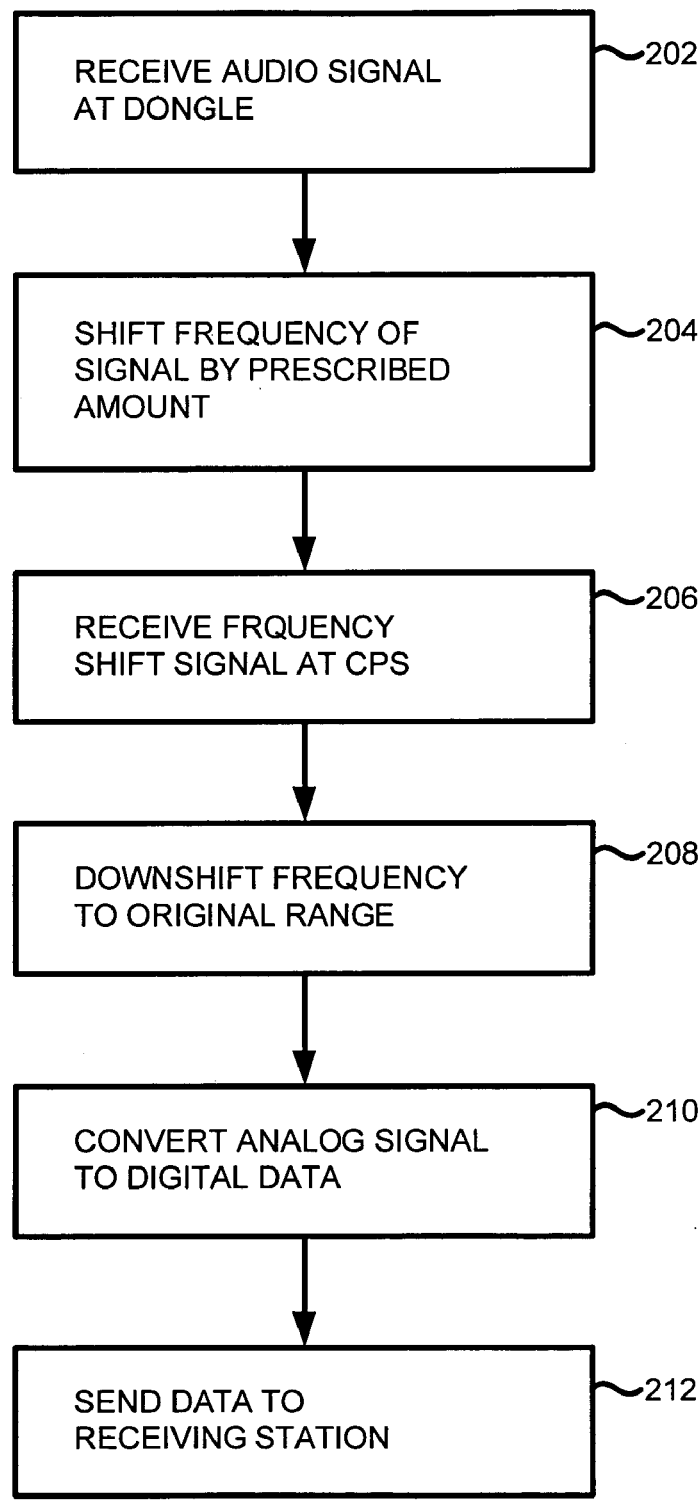
FIG. 2 is a flowchart illustrating a process used in one embodiment to process an outgoing audio signal during an alternative network telephony call, such as when a user speaks into the handset 104 of FIG. 1 during an alternative network telephony call.

FIG. 2 is a flowchart illustrating a process used in one embodiment to process an outgoing audio signal during an alternative network telephony call, such as when a user speaks into the handset 104 of FIG. 1 during an alternative network telephony call. In step 202, the audio signal output by the handset 104 is received at the dongle 106. In step 204, the dongle shifts the frequency of the audio signal by a prescribed amount and outputs the frequency-shifted audio signal to the internal telephone wiring 108. In step 206, the frequency-shifted signal is received at the call processing system 110. In step 208, the frequency-shifted signal is downshifted to the original frequency range of the audio signal output by the handset 104. In step 210, the analog audio signal is converted to digital audio data. Finally, in step 212, the digital audio data is sent to the receiving station via alternative network telephony, such as by Internet protocol (IP) telephony.

Figure 3:
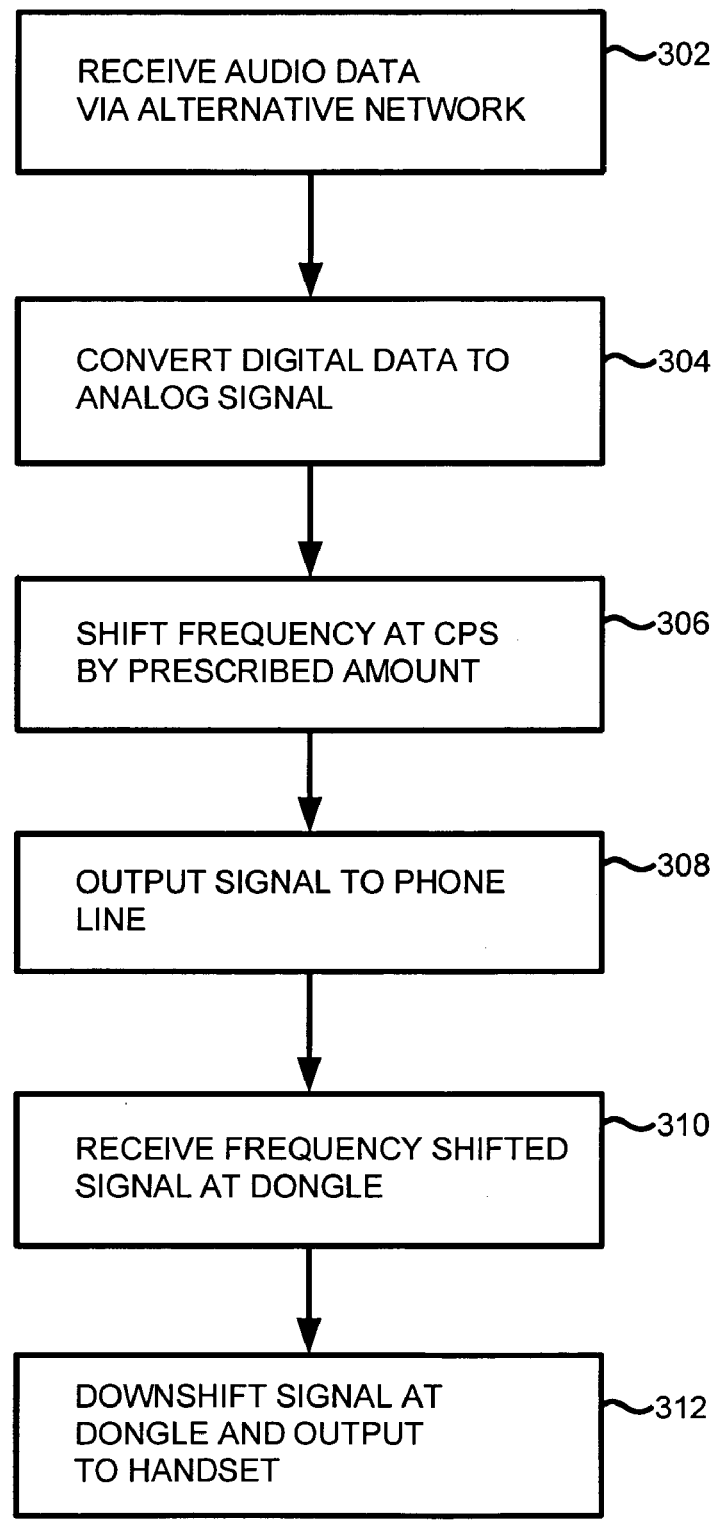
FIG. 3 is a flow chart illustrating a process used in one embodiment to process incoming audio data during an alternative network telephony call, such as occurs when a remote participant has spoken during the call and the audio data so generated has been sent in digital form via the alternative network and received by the call processing system 110 via the alternative network connection 112.

FIG. 3 is a flow chart illustrating a process used in one embodiment to process incoming audio data during an alternative network telephony call, such as occurs when a remote participant has spoken during the call and the audio data so generated has been sent in digital form via the alternative network and received by the call processing system 110 via the alternative network connection 112. In step 302, the audio data is received by the call processing system 110 via the alternative network. In step 304, the call processing system 110 converts the digital audio data received to an analog audio signal. In step 306, the call processing system 110 shifts the analog audio signal in frequency by a prescribed amount. In one embodiment, the magnitude of the frequency shift for incoming audio data is the same as the frequency shift applied by the dongle 106 to outgoing audio data. In step 308, the call processing system outputs the frequency-shifted audio signal to the internal telephone wiring 108. In step 310, the frequency-shifted audio signal is received at the dongle 106. In step 312, the frequency-shifted audio signal is down shifted in frequency by the dongle 106 and is provided as output to the handset 104.

As noted above, during the processing of outgoing and incoming audio data during an alternative network telephony call as described and illustrated in FIGS. 2 and 3, the filter 114 of the system shown in FIG. 1 operates to prevent any of the frequency shifted audio signal data from passing to the PSTN. In this manner, the PSTN system and equipment do not perceive any activity on the internal telephone wiring 108 and, as a result, the processing of the alternative network telephony call does not interfere with the PSTN and the PSTN is not prompted or caused to interfere in any way with the processing of the alternative network telephony call.

Typically, an alternative network call processing system such as call processing system 110 of FIG. 1 requires a power source in order to process telephone calls via the alternative network. Therefore, the alternative network call processing system may be unavailable during power outages. In addition, there may be times when the call processing system 110 is unavailable for other reasons, such as a system error, the system being busy with other tasks, or the system being turned off by the user.

In order to insure that telephone service remains via the PSTN at times when the alternative network call processing system is not available, the dongle 106 is equipped in one embodiment with a switch that enables the dongle to connect the telephone handset 104 to the internal telephone wiring 108 through a frequency shifter during times when the alternative network call processing system is available; or instead to bypass and connect the telephone handset 104 directly to the internal telephone wiring 108, so that calls may be completed without frequency shifting via the PSTN, during times when the alternative network call processing system is not available.

Figure 4:
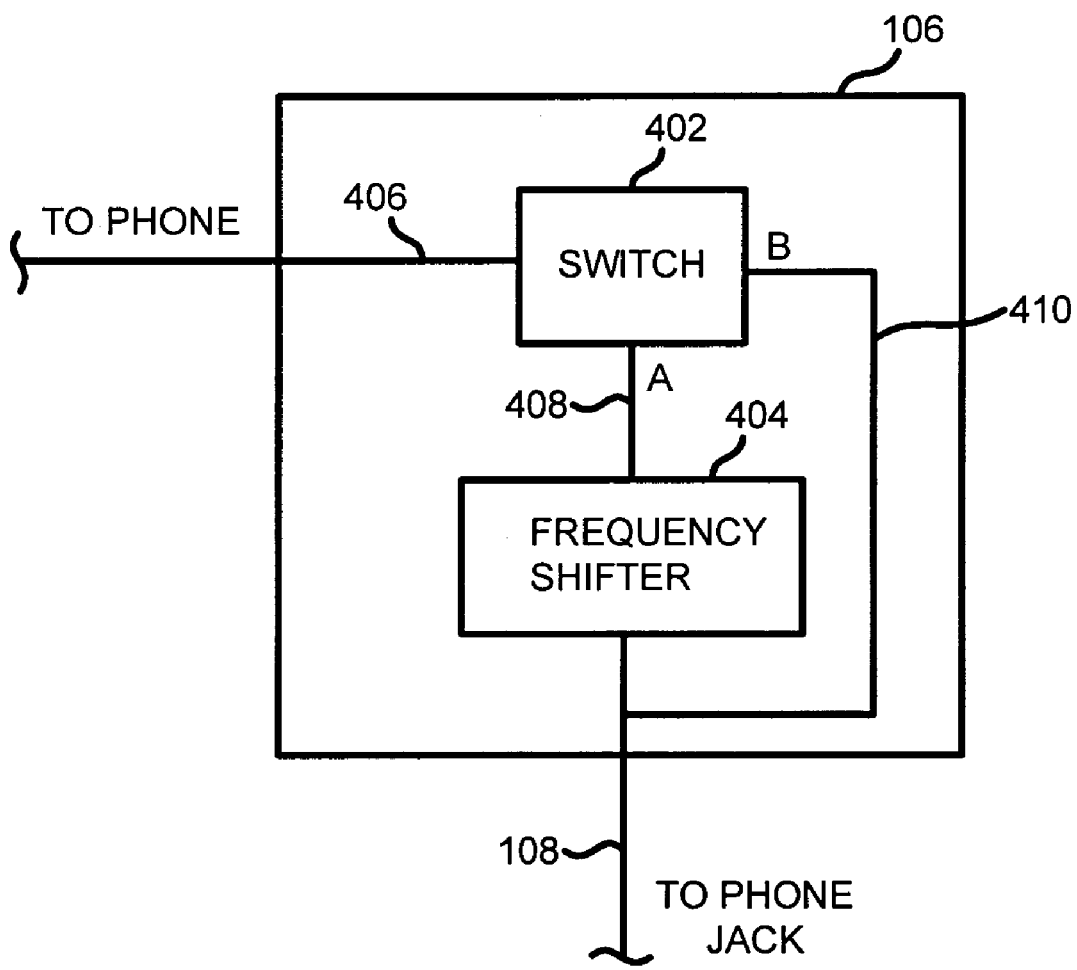
FIG. 4 shows the dongle 106 of FIG. 1 comprising a switch 402 and a frequency shifter 404.

FIG. 4 shows the dongle 106 of FIG. 1 comprising a switch 402 and a frequency shifter 404. The switch 402 is shown as having two positions. In a first position, marked "A" in FIG. 4, the line 406 connected to the telephone handset 104 is connected to the frequency shifter 404 via a line 408. When the switch 402 is in position "A", the telephone handset is connected via line 406, switch 402, and line 408 to the frequency shifter 404, and from there to the internal telephone wiring 108. In a second position, marked "B" in FIG. 4, the telephone handset 104 is connected via line 406 and switch 402 to a bypass line 410, which bypasses the frequency shifter 404 and connects the telephone handset 104 directly to the internal telephone wiring 108, without first passing through the frequency shifter 404. As described more fully below, in one embodiment, the switch 402 is in position "A" whenever the alternative network call processing system 110 is available. In one embodiment, if the alternative network call processing system 110 is not available, the switch 402 automatically shifts to the position "B" and the frequency shifter within the dongle 106 is bypassed, permitting telephone calls to be completed via the PSTN in the normal manner, instead of being processed as alternative network telephony calls. If the frequency shifter within the dongle is bypassed, the filter 114 will not block the signal from the telephone handset 104 to the PSTN and the PSTN will respond in the normal manner to process any call placed using the handset 104.

Figure 5:
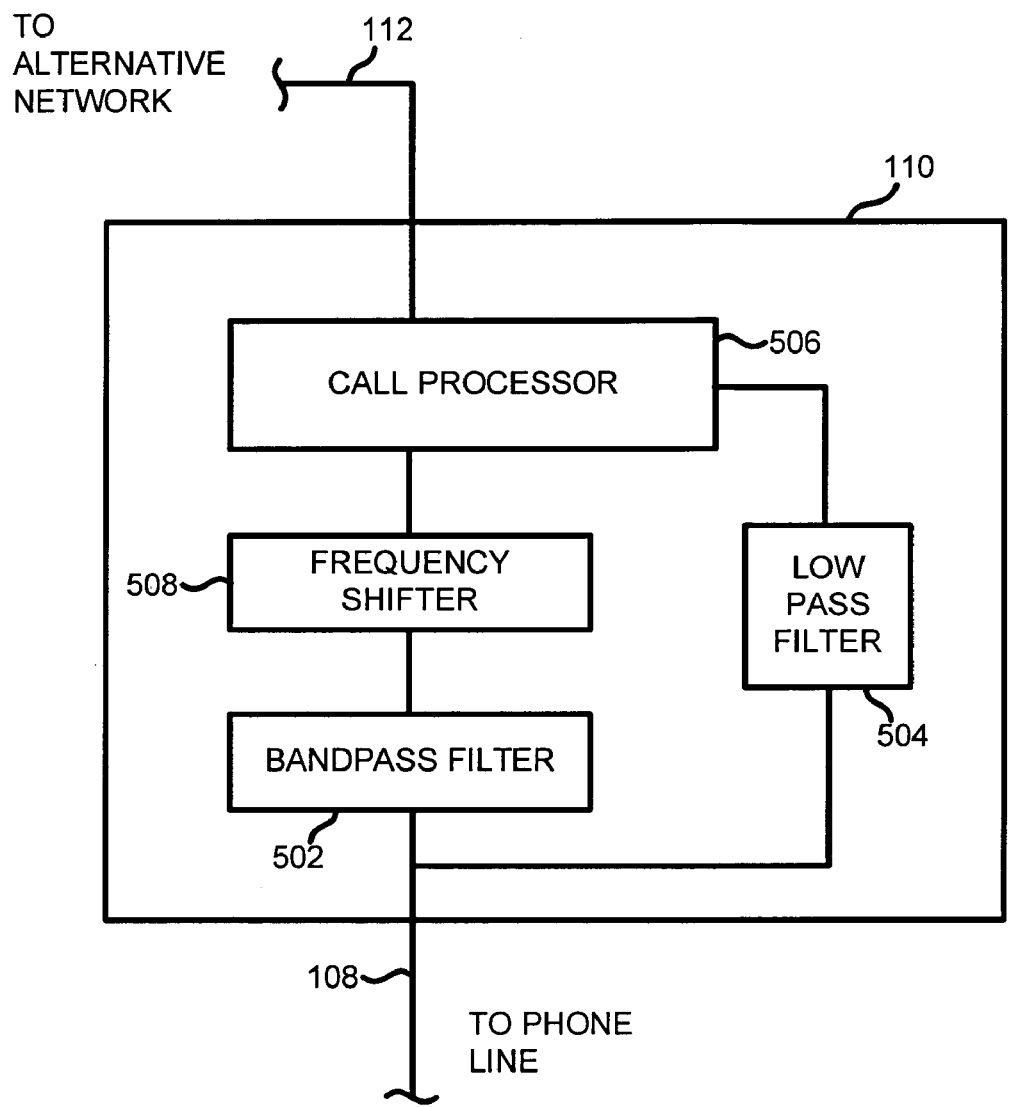
FIG. 5 shows the alternative network call processing system 110 connected via a first connection to the internal telephone wiring 108 and connected via alternative network connection 112 to the alternative network.

FIG. 5 shows the alternative network call processing system 110 connected via a first connection to the internal telephone wiring 108 and connected via alternative network connection 112 to the alternative network. In the embodiment shown in FIG. 5, the line connected to the internal telephone wiring 108 is connected to a band pass filter 502 and a low pass filter 504. In one embodiment, audio signals on the internal telephone wiring 108 that have not been frequency shifted pass through the low pass filter 504 to the call processor 506 so that such signals may be received and processed by the call processor without being downshifted. In one embodiment, such a connection may be useful to allow for the processing of calls via the PSTN, if desired, during times when the switch in dongle 106 is in the position for processing calls via the alternative network.

Band pass filter 502 is configured such that only signals in the frequency range of the frequency shifted signal output by dongle 106 pass through the band pass filter 502 to the call processing system frequency shifter 508. The call processing frequency shifter 508 receives frequency-shifted outgoing audio signals from the internal telephone wiring 108 via the band pass filter 502, downshifts such signals, and outputs them to the call processor 506 for processing and transmission via the alternative network 112 in the manner well known in the art of alternative network telephony. Likewise, as described above in connection with FIG. 3, alternative network call data received via the alternative network connection 112 enters the call processing system 110 via the call processor 506 where it is reassembled, if necessary, and converted to an analog audio signal that is output to the frequency shifter 508, where it is shifted in frequency and output via the band pass filter 502 to the internal telephone wiring 108. The frequency-shifted signal output from the call processing system 110 as described is at a frequency that does not pass through the low pass filter 504. Therefore, the signal does not re-enter the call processor 506 via the low pass filter 504.

Figure 6:
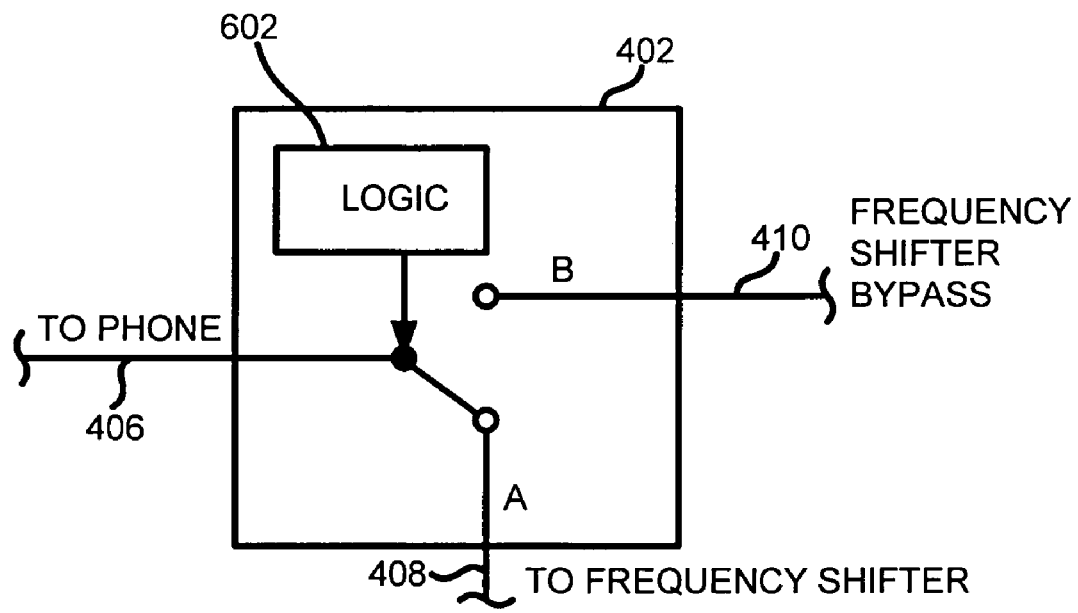
FIG. 6 shows additional details of the switch 402 shown in FIG. 4 as being a component part of the dongle 106 of FIG. 1.

FIG. 6 shows additional details of the switch 402 shown in FIG. 4 as being a component part of the dongle 106 of FIG. 1. FIG. 6 shows the line 410 of FIG. 4 connected to the terminal "B" of the switch, and the line 408 of FIG. 4 connected to the terminal "A" of the switch 402. As shown in FIG. 6, the switch 402 is in the position where the line 406 connected to the telephone handset 104 is coupled to the frequency shifter via the line 408, i.e. the switch is in position "A". The switch 402 is shown in FIG. 6 as comprising a control logic 602 used to determine whether the switch will be in position "A" or position "B". In one embodiment, as described above, the control logic 602 is such that the switch 402 is maintained in the position "A" when the alternative network call processing system 110 is available, and defaults to place the switch 402 in position "B" if the alternative network call processing system 110 is not available.

Figure 7:
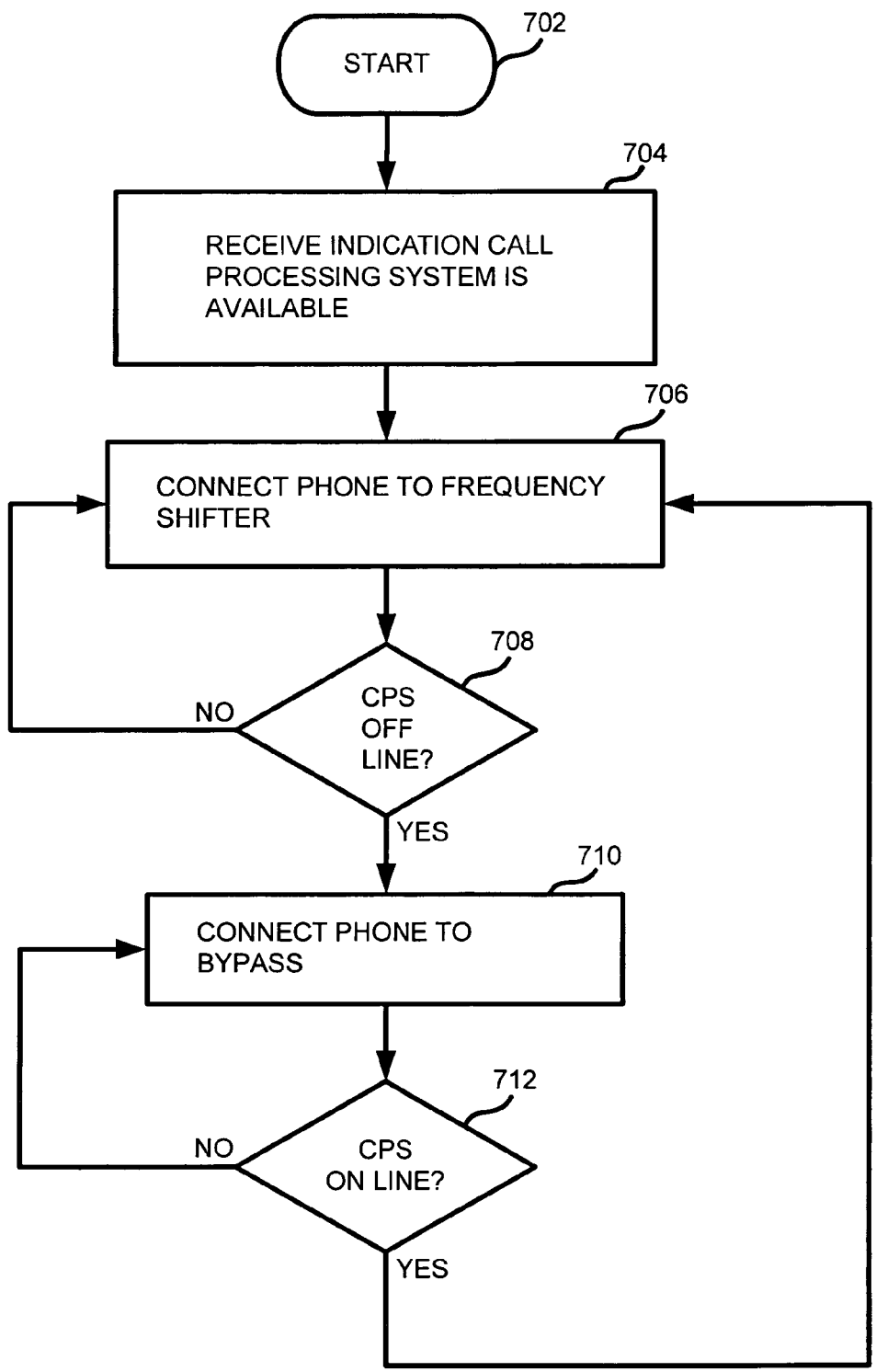
FIG. 7 is a flow chart of control logic used in one embodiment to control the position of the switch 402 of FIGS. 4 and 6, such as may be implemented as control logic 602 of FIG. 6.

FIG. 7 is a flow chart of control logic used in one embodiment to control the position of the switch 402 of FIGS. 4 and 6, such as may be implemented as control logic 602 of FIG. 6. The process starts in step 702 and proceeds to step 704 in which an indication is received that the call processing system is available. The process then proceeds to step 706 in which the switch 402 is placed in a position that connects the phone hand set 104 to the frequency shifter in the dongle 106, such as the frequency shifter 404 of FIG. 4. In step 708, the alternative network call processing system 110 is monitored to determine if the alternative network call processing system has gone off line. In one embodiment, the alternative call processing 110 is configured to output, either continuously or periodically, a presence signal at a prescribed frequency, which signal is received by the dongle 106 and provided to the control logic 602 of FIG. 6 to enable the determination of step 708 to be made. In one alternative embodiment, the alternative network call processing system 110 instead outputs a control voltage indicating to the dongle 106 that the call processing system is available. As will be apparent to those of ordinary skill in the art, any number of approaches may be used to provide an indication from the alternative network call processing system 110 to the control logic 602 of the switch 402 to indicate that the call processing system is available. If it is determined in step 708 that the call processing system has not gone off line, the process returns to step 706 and the telephone handset 104 remains connected to the frequency shifter within the dongle 106. If it is determined in step 708 that the call processing system has gone off line, the process advances to step 710 in which the position of the switch 402 within the dongle 106 is shifted to connect the telephone handset 104 directly to the internal telephone wiring 108 via the line that bypasses the frequency shifter within the dongle, such as bypass line 410 shown in FIGS. 4 and 6. In step 712, the call processing system is monitored to determine if the call processing system has come back on line and is once again available to process calls via the alternative network. If it is determined in step 712 that the call processing system has not come back on line, the process returns to step 710 in which the switch 402 within the dongle 106 remains in the by pass position in which the telephone handset 104 is connected to the internal telephone wiring 108 via a by pass line that by passes the frequency shifter within the dongle 106. If it is determined in step 712 that the call processing system 110 has come back on line, the process returns to step 706 in which the position of the switch within the dongle 106 is shifted to connect to the telephone handset 104 to the frequency shifter within the dongle, such as by placing the switch 402 of FIG. 4 in the position "A", thereby connecting the telephone handset 104 to the frequency shifter 404. In this manner, the switch 402 within the dongle 106 connects the telephone handset 104 to the internal telephone wiring 108 via the frequency shifter 404 when the alternative network call processing system is available, but defaults to connecting the telephone handset 104 directly to the internal telephone wiring 108, bypassing the frequency shifter 404, if the alternative network call processing system 110 is not available. As will be readily apparent to those of ordinary skill in the art, other conditions and criteria may be used to determine when the switch within the dongle 106 will be in the position connecting the telephone handset to the internal telephone wiring via the frequency shifter, and when it instead will be in the bypass position connecting the telephone handset directly to the internal telephone wiring.

While one or more embodiments described in detail herein employ frequency shifting, the present disclosure contemplates and encompasses approaches in which other encoding techniques are used. The only requirement is that the alternative network call processing system must be able to distinguish between signals on the internal telephone wiring, such as internal telephone wiring 108 of FIG. 1, that are in the normal frequency range for the system, such as the normal voice range, which are meant to be processed normally over the PSTN, and specially encoded signals which are meant to be processed not by the PSTN but instead by the alternative network call processing system. For example, and without limitation, any suitable type of frequency encoding may be used. In one embodiment, instead of using frequency shifting as described above an incoming or outgoing audio signal may be used to frequency modulate one or more carrier waves having a frequency outside the normal frequency range of a voice signal. In one such embodiment, frequency filters may be used to permit applicable components to either operate on, or ignore, a signal depending on the carrier frequency used, in a manner similar to the frequency shifting approach described above. In one embodiment, in the system of FIG. 1 the dongle 106 is configured to encode and decode voice signals originated by and destined for the handset 104, respectively, in accordance with the encoding method the remaining system components, such as alternative network call processing system 110, are configured to use. For example, in one embodiment where frequency modulation encoding is used, the dongle 106 is configured to use a voice range audio signal generated by handset 104 to modulate a carrier frequency sufficiently outside the normal voice range to enable the relevant remaining components to distinguish such an encoded signal from an unencoded a voice range audio signal. In one embodiment, the dongle 106 is configured to receive a signal encoded using frequency modulation of a carrier signal having a frequency outside the normal voice range, demodulate the signal, and present the decoded original signal as audio output on handset 104.

While processing of calls comprising voice audio signals is described above, the approach described herein may as well be used to handle other types of audio signals. In such other cases, the frequency shift, carrier frequency, or other encoding parameter, as appropriate, is selected so as to ensure that the relevant system components can distinguish between and encoded signal and one that has not been encoded. As used herein, the term "encoding" means transforming the signal into a form so that system components may be configured to distinguish between the encoded signal and a signal that has not been encoded, such as by, without limitation, adjusting, modifying, or transforming the signal, combining the signal with another signal, using the signal to modulate another signal or carrier wave, etc.

Using the configuration and approached described herein, telephone calls placed at the normal telephone handset may be completed via alternative network telephony over the internal telephone wiring infrastructure, without interference with or from the PSTN, so long as the alternative network call processing system is available, or whenever whatever other or different criteria have been met. Otherwise, the system defaults to completing calls via the PSTN, in the normal manner for making such calls, via a mechanism that is seamless, automatic, and transparent to the caller.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for providing alternative network telephony, comprising:

receiving an indication as to whether an alternative network telephony call processing system is available to process calls from an associated piece of telephone equipment, the indication being received automatically and transparently to a user of the telephone equipment;

processing via alternative network telephony calls placed from the telephone equipment at a time when the alternative network telephony call processing system is available to process calls including by:

receiving outgoing audio data at a first local node;

shifting the outgoing audio data up in frequency at the first local node by a first frequency shift;

providing the frequency shifted outgoing audio data to local telephone wiring connected to the first local node;

receiving the frequency shifted outgoing audio data at a second local node connected to the local telephone wiring;

downshifting the frequency shifted outgoing audio data in frequency by the first frequency shift; and using alternative network telephony to send the downshifted outgoing audio data to a destination; and processing via the public switched telephone network (PSTN) calls placed from the telephone equipment at a time when the alternative network telephony call processing system is not available to process calls.

2. The method of claim 1, wherein an indication is received that the alternative network telephony call processing system is not available if the alternative network call processing system loses power.

3. The method of claim 1, wherein the alternative network telephony call processing system is configured to generate an availability signal indicating that the alternative network call processing system is available, and the method further comprises:
  determining that the alternative network call processing system is available if the availability signal is received; and
  determining that the alternative network call processing system is not available if the availability signal is not received.

4. The method of claim 1, further comprising providing a filter to prevent frequency shifted audio signals placed on the local telephone wiring from being passed to the PSTN.

5. The method of claim 1, further comprising providing a filter at the first local node to prevent non-frequency shifted audio signals from being passed to the telephone equipment at times when the alternative network call processing system is available.

6. The method of claim 1, wherein the indication as to whether the alternative network telephony call processing system is available is received at the first local node.

7. The method of claim 1, wherein the steps of processing via alternative network telephony calls placed from the telephone equipment at a time when the alternative network telephony call processing system is available and processing via the public switched telephone network (PSTN) calls placed from the telephone equipment at a time when the alternative network telephony call processing system is not available comprise:
  receiving the outgoing audio data at the first local node;
  routing the outgoing audio data through a frequency shifter if the alternative network telephony call processing system is available; and
  bypassing the frequency shifter if the alternative network telephony call processing system is not available.

8. The method of claim 1, further comprising for a call placed at a time when the alternative network call processing system is not available:
  receiving outgoing audio data at the first local node; and
  providing the outgoing audio data to the local telephone wiring without applying any frequency shift;
  wherein the local telephone wiring is connected to the PSTN such that the non-frequency shifted audio data is provided to the PSTN.

9. The method of claim 1, wherein the outgoing audio data is associated with an alternative network telephony call between a first party who provided the outgoing audio data and a second party at the destination, further comprising:
  receiving at the second node, via alternative network telephony, incoming audio data from the destination;
  frequency shifting the incoming audio data in frequency by a second frequency shift;
  providing the frequency shifted incoming audio data to the local telephone wiring;
  receiving the frequency shifted incoming audio data at the first node;
  downshifting the frequency shifted incoming audio data by the second frequency shift; and
  providing the downshifted incoming audio data to a local call participant associated with the first node.

10. The method of claim 1, wherein the telephone equipment comprises a telephone handset.

11. The method of claim 1, wherein the telephone equipment comprises a fax machine.

12. The method of claim 1, wherein the telephone equipment comprises a computer modem.

13. A method for providing alternative network telephony for calls placed from a piece of telephone equipment associated with local telephone wiring connected to the PSTN, comprising:
  receiving at a first local node connected to the local telephone wiring outgoing audio data generated by the telephone equipment;
  shifting the outgoing audio data up in frequency by a first frequency shift;
  providing the frequency shifted outgoing audio data to the local telephone wiring;
  receiving the frequency shifted outgoing audio data at a second local node connected to the local telephone wiring;
  downshifting the frequency shifted outgoing audio data in frequency by the first frequency shift; and
  using alternative network telephony to send the downshifted outgoing audio data to a destination.

14. A system for providing alternative network telephony for a telephone equipment associated with local telephone wiring, comprising:
  an alternative network telephony call processing system having a first connection to the local telephone wiring and a second connection to an alternative network, the call processing system comprising a processor configured to complete calls via the alternative network using alternative network telephony;
  a connector interposed between the telephone equipment and the local telephone wiring, the connector being configured to:
    receive an indication whether the alternative network call processing system is available;
    modify outgoing audio data received from the telephone equipment and provide the modified outgoing audio data to the local telephone wiring if the alternative network call processing system is available; and
    provide outgoing audio data received from the telephone equipment to the local telephone wiring without modification if the alternative network call processing system is not available;
  wherein the alternative network call processing system is configured to receive modified outgoing audio data via the local telephone wiring, restore the modified outgoing audio data to its original form, and send the restored outgoing audio data to a destination via alternative network telephony, and wherein outgoing audio data that has not been modified is passed to the public switched telephone network (PSTN) whereby calls may be completed normally via the PSTN at times when the alternative network telephony call processing system is not available.

15. The system of claim 14, wherein the connector is configured to modify outgoing audio data by shifting outgoing audio data up in frequency by a first frequency shift and the alternative network call processing system is configured to restore the frequency shifted outgoing audio data to its original form by downshifting the frequency shifted outgoing audio data in frequency by the first frequency shift.

16. The system of claim 15, further comprising a filter interposed between the local telephone wiring and the PSTN to prevent frequency shifted audio signals provided to the local telephone wiring from being passed to the PSTN.

17. The system of claim 15, wherein the indication whether the alternative network call processing system is available comprises an indication as to whether power is available to the alternative network call processing system.

18. The system of claim 15, wherein the alternative network call processing system is further configured to provide the indication whether the alternative network call processing system is available.

19. The system of claim 18, wherein the indication whether the alternative network call processing system is available comprises a signal at a prescribed frequency provided to the local telephone wiring by the alternative network call processing system.

20. The system of claim 15, wherein the alternative network call processing system is further configured to receive incoming audio data from the destination via the alternative network telephony, shift the incoming audio data up in frequency by a second frequency shift, and provide the frequency shifted incoming audio data to the local telephone wiring, and wherein the connector is further configured to receive frequency shifted incoming audio data via the local telephone wiring, downshift the received frequency shifted incoming audio data in frequency by the second frequency shift, and provide the downshifted incoming audio data to the telephone equipment.

21. The system of claim 20, wherein the first frequency shift and the second frequency shift are the same.

22. The system of claim 15, wherein the connector comprises a frequency shifter configured to apply the first frequency shift and a switch configured to route outgoing audio data to the frequency shifter if the alternative network call processing system is available.

23. The system of claim 22, wherein the switch is configured to route outgoing audio data to the local telephone wiring without first sending it through the frequency shifter if the alternative network call processing system is not available.

24. The system of claim 15, wherein the alternative network call processing system is configured to ignore audio signals received via the local telephone wiring that have not been frequency shifted.

25. The system of claim 15, wherein the alternative network call processing system comprises a television set top box.

26. A connector for use in providing alternative network telephony for a telephone equipment associated with local telephone wiring using an alternative network telephony call processing system having a first connection to the local telephone wiring and a second connection to an alternative network, the connector comprising:
a first connection to the telephone equipment, the connector being configured to receive outgoing audio data via the first connection;
a frequency shifter configured to shift outgoing audio data received via the first connection up in frequency by a first frequency shift if the alternative network call processing system is available; and
a second connection to the local telephone wiring, the connector being configured to provide frequency shifted outgoing data to the local telephone wiring via the second connection;
wherein the alternative network call processing system is configured to receive and process frequency shifted outgoing audio data using alternative network telephony.

27. The connector of claim 26, further comprising a switch configured to route outgoing audio data received at the first connection through the frequency shifter if the alternative network call processing system is available and to instead bypass the frequency shifter and provide the non-frequency shifted outgoing audio data to the local telephone wiring via the second connection if the alternative network call processing system is not available, whereby calls may be completed using alternative network call processing at times when the alternative network call processing system is available and calls may instead be completed in the traditional manner via the public switched telephone network (PSTN) at times when the alternative network call processing system is not available.

28. The connector of claim 26, wherein the alternative network call processing system is configured to provide an availability indication indicating that the alternative network call processing system is available and wherein the connector is configured to receive the availability indication and to shift outgoing audio data received via the first connection up in frequency by a first frequency shift if the availability indication indicates that the alternative network call processing system is available.

29. An alternative network call processing system for processing via alternative network telephony calls associated with a telephone equipment associated with local telephone wiring, comprising:
a first connection to the local telephone wiring;
a second connection to an alternative network over which the call processing system is configured to process calls using alternative network telephony;
a frequency shifter configured to receive via the first connection outgoing audio data that has been shifted up in frequency by a first frequency shift and downshift the received frequency shifted outgoing audio data by the first frequency shift; and
a call processor configured to receive the downshifted outgoing audio data and send it to a destination using alternative network telephony.

30. The alternative network call processing system of claim 29, wherein the call processor is further configured to receive from the destination incoming audio data and the alternative network telephony call processing system is further configured to shift the incoming audio data up in frequency by a second frequency shift and provide the frequency shifted incoming audio data to the local telephone wiring.

31. The alternative network call processing system of claim 30, wherein the first frequency shift and the second frequency shift are the same.

32. The alternative network call processing system of claim 29, wherein the call processing system is configured to provide to the local telephone wiring an indication that the call processing system is available to process calls using alternative network telephony.

* * * * *